(12) United States Patent
Sonoda et al.

(10) Patent No.: US 6,334,370 B1
(45) Date of Patent: Jan. 1, 2002

(54) BALL SCREWED NUT, LINEARLY GUIDING APPARATUS USING THE SAME, BALL SCREW FOR STEERING AND METHOD OF MANUFACTURING THE BALL SCREWED NUT

(75) Inventors: Katsuhiro Sonoda, Yamagata; Takeki Shirai, Tokyo; Shigeru Yamanaka, Osaka, all of (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/393,660

(22) Filed: Sep. 10, 1999

(30) Foreign Application Priority Data

Sep. 11, 1998 (JP) .............................. 10-258611

(51) Int. Cl.$^7$ ............................. F16H 25/22; B21H 3/08
(52) U.S. Cl. ................ 74/424.81; 74/89.33; 74/424.82; 74/499; 29/898.03; 29/898.066; 72/370.17; 72/370.21; 470/25
(58) Field of Search ........................ 74/89.15, 424.8 R, 74/459, 499, 89.33, 424.81, 424.82; 29/898.03, 898.063, 898.066; 72/370.21, 370.17; 470/18, 25

(56) References Cited

U.S. PATENT DOCUMENTS

| | | | | |
|---|---|---|---|---|
| 3,017,697 A | * | 1/1962 | Wlodek ........................ 72/377 |
| 3,662,578 A | * | 5/1972 | Gleason et al. ................. 72/75 |
| 4,255,980 A | * | 3/1981 | Yanai ..................... 74/388 PS |
| 4,498,322 A | * | 2/1985 | Toropov et al. .............. 72/118 |
| 5,311,788 A | * | 5/1994 | Kasuga ....................... 74/89.15 |
| 5,492,030 A | * | 2/1996 | Benton et al. ................ 74/441 |
| 5,551,314 A | * | 9/1996 | Andrzejewski, Jr. et al. . 74/459 |
| 6,116,109 A | * | 9/2000 | Zernickel ..................... 74/459 |

OTHER PUBLICATIONS

Publication ISBN 4–87403–001–7 dated Apr. 1, 1981 "Rotational Molding Work", pp. 128–131.*

* cited by examiner

Primary Examiner—Allan D. Herrmann
(74) Attorney, Agent, or Firm—Morgan, Lewis & Bockius LLP

(57) ABSTRACT

A ball rolling groove 1c is defined in an inner peripheral surface of A ball screwed nut 1 by a rolling process, not by a grinding process so that a ball screwed nut having small diameters or large leads can be manufactured. The surface of the ball rolling groove 1c is finished to be sharp without concave and convex by a plastic working by the rolling process, so that the surface is less rough. By rolling the surface by the rolling process excellent in durability, the precision of R shape of the ball rolling groove 1c can be made excellent.

8 Claims, 8 Drawing Sheets (S1)

(S2)

(S3)

(S4)

(S5)

(S6)

BALL SCREWED NUT, LINEARLY GUIDING APPARATUS USING THE SAME, BALL SCREW FOR STEERING AND METHOD OF MANUFACTURING THE BALL SCREWED NUT

BACKGROUND OF THE INVENTION

1. Field of the Invention

The present invention relates to a ball screwed nut defined with a spiral ball rolling groove in which balls roll, a linearly guiding apparatus using the ball screwed nut, a bail screw for steering, and a method of manufacturing the bail screwed nut.

2. Description of the Related Art

Conventionally, a ball screwed nut was defined in an internal groove with a ball rolling groove by cutting and grinding. As a method of defining the ball rolling groove in the ball screwed nut, the following method has been known. At first, a prepared hole is opened in a blank material by a drill. Next, a spiral ball rolling groove is cut in the peripheral surface of the prepared hole by a bit. Finally, the ball rolling groove thus cut is ground on its surface with a grinding stone.

However, in the conventional ball screwed nut defined with the ball rolling groove by the cutting and grinding processes, there is a case where when grinding a ball screwed nut small in inner diameter, a grinding stone cannot be inserted into a prepared hole, thereby making the grinding process impossible. Otherwise, similarly to the ball screwed nut having the small inner diameter, even in a ball screwed nut having a large lead, there is a case in which since an inserting amount of the grinding stone into the prepared hole is limited because a lead angle is large, the grinding process cannot be performed.

Besides, in the grinding process, concave and convex in cross section of a ball rolling groove to be machined are sharpened. As a result, when the balls roll on the processed part, a convex is leveled and worn, the generation of worn powders and the reduction of pre-load by an amount of wearing the convex is induced. Since the grinding stone is fixed at a front end of a shaft which is cantilevered, the grinding stone may be subjected to chattering vibration during grinding operation or probably pushed off from a ground face by bending the shaft of the grinding stone. Consequently, there was a fear that the roughness of surface is more furthered in the conventional art.

Besides, in the grinding process of the ball rolling groove, the grinding stone is liable to be worn because of the small diameter of the grinding stone to lower the precision of shape of the radius of curvature of the ball rolling groove. As a result, the precision of the radius of curvature of the ball rolling groove is liable to be varied, resulting in a variation of the diameter, irregularity in sizing or lowering of degree in roundness.

SUMMARY OF THE INVENTION

Accordingly, an object of the invention which has been made in view of the above is to provide a ball screwed nut which can be formed with a ball screw having a ball rolling groove small in diameter or large in lead, and which is small in surface roughness of the ball rolling groove and high in precision of R shape of the ball rolling groove, and a method of manufacturing the ball screwed nut.

To achieve the above object, according to a first aspect of the invention, there is provided a ball screwed nut which is defined in an inner peripheral surface thereof with a ball rolling groove in which balls roll, in which the ball rolling groove is formed by a rolling process.

According to this invention, since the ball rolling is subjected to a rolling process, the ball rolling groove can be formed without the grinding process. Therefore, a ball screwed nut even having a small diameter or a large lead can be produced. Further, by a plastic working employing the rolling process, the surface of the ball rolling groove is processed in a sharp and flat face without creating concave and convex thereon, and is therefore mirror-finished with less roughness. Thus, wearing of the surface of the ball rolling groove caused by rolling the balls is reduced, and the pre-load is maintained, with the result that the durability of the ball screw can be enhanced. In addition, since the ball rolling groove is formed by the rolling process not by the grinding stone which is easily worn but by the plastic working tool such as a rolling tap excellent in the durability, the precision of R shape in the surface of the ball rolling groove can be made excellent.

According to a second aspect of the invention, there is provided the ball screwed nut defined in the first aspect of the invention, in which the ball rolling groove is finished on the surface thereof by a burnishing process.

According to the invention, concave and convex on the surface of the ball rolling groove are evened by the burnishing process into a more smoothened surface.

According to a third aspect of the invention, there is provided the ball screwed nut defined in the first or second aspect of the invention, in which the ball screwed nut is made of a stainless steel corresponding to SUS-27 of Japanese Industrial Standards (JIS), and hardness of the surface of the ball rolling groove which has been subjected to work hardening by the rolling process is 40 or more in C scale of Rockwell hardness.

According to the invention, since metal structure of the ball rolling groove is continued in fibrous texture, the surface of the ball rolling groove is work-hardened to enhance hardness. Since the ball screwed nut is made of a stainless steel corresponding to SUS-27 of Japanese Industrial Standards (JIS), and the hardness of the surface of the ball rolling groove which has been subjected to work hardening is set to 40 or more in C scale of Rockwell hardness, the ball rolling groove having the hardness sufficient to roll the balls can be available.

According to a fourth aspect of the invention, there is provided a linearly guiding apparatus comprising: a ball screwed shaft having a first spiral ball rolling groove in an outer peripheral surface and, a slider supported movably in a longitudinal direction of guide rails and including an endless circuit with a second spiral ball rolling groove corresponding to the first spiral ball rolling groove, and a plurality of balls arranged in line in the endless circuit so as to roll therein in association with movement of the slider, the slider being reciprocated while the ball screwed shaft rotates, wherein the second ball rolling groove of the slider is formed by the rolling process.

According to the invention, in addition to the actions and effects obtained by the first aspect of the invention, even if the slider extends along the longitudinal direction of the guide rail, the ball rolling groove can be formed in the center of the slider. Therefore, a force of reciprocating the slider can be exerted on the center of the slider so as to check twisting of the slider, so that the reciprocation of the slider is well balanced.

According to a fifth aspect of the invention, there is provided the ball screw for steering, comprising: a ball screwed shaft having a first spiral ball rolling groove in an external peripheral surface thereof and connected to a steering wheel; a ball screwed nut having an endless circuit with a second spiral ball rolling groove corresponding to the first ball rolling groove and a steering gear on an external periphery thereof, and a plurality of balls arranged in the endless circuit of the ball screwed nut to roll while receiving a load between the first and second ball rolling grooves, wherein the second ball rolling groove of the ball screwed nut is formed by a balling process.

According to the invention, as described in the first aspect of the invention, since the second ball rolling groove of the ball screwed nut is formed by the rolling process, the surface of the second ball rolling groove is processed in a sharp and flat surface without creating concave and convex thereon, and is mirror-finished with less roughness. Thus, wearing of the surface of the second ball rolling groove caused by rolling the balls is reduced, and a pre-load is maintained, so that the durability of the ball screw can be improved. In addition, the ball rolling groove is formed by the rolling process not by a grinding stone which is readily worn but by a plastic working tool such as a rolling tap excellent in the durability, so that the precision of R shape in the surface of the ball rolling groove can be made excellent.

According to a sixth aspect of the invention, there is provided a method of manufacturing a ball screwed nut defined with a spiral ball rolling groove in which balls roll, said method comprising the steps of: forming a prepared hole in a blank material, and rolling the ball rolling groove by relatively rotating the blank material and a plastic working tool while inserting the plastic working tool into the prepared hole. A rolling tap may be used to the plastic working tool.

According to the invention, since there is provided the step of rolling the ball rolling groove in the ball screwed nut, one process of the rolling process is sufficient, although the conventional method requires two processes consisting of the cutting and grinding processes, whereby the processing cost for the ball rolling groove can be lowered, and a lead time can be shortened as the processing steps are saved.

According to a seventh aspect of the invention, there is provided the method as defined in the sixth aspect of the invention, further comprising the step of cutting the spiral groove in the inner peripheral surface of the prepared hole, wherein the rolling step includes the sub-step of screwing the plastic working tool in the spiral groove.

According to the invention, since there is provided the step of cutting the spiral groove in the prepared hole, a processing resistance of the plastic working tool is reduced in the rolling process, and the ball screwed nut having the ball rolling groove large in diameter processing resistance can be formed by the rolling process.

According to an eighth aspect of the invention, there is provided the method as defined in the seventh aspect of the invention, wherein a groove to be formed by the cutting process is almost V-shaped in cross section.

According to the invention, since the groove of substantially V-shaped in cross section is cut in the cutting process, when it is plastic-worked by the plastic working tool, a flow of the blank material caused by pressure of the plastic working tool is diverged into two directions, that is, in a direction of a bottom having the R shape in cross section and outwardly thereof at a first contacting point between the plastic working tool and the V shaped groove as the flow dividing point. Therefore, compared with a case in which a flat prepared hole not formed with the V shaped groove is plastic-worked and the blank material is caused to flow from the R-shaped bottom outwardly, a flowing distance of the blank material can be shortened, so that a microscopic spring back caused by the plastic deformation of the ball rolling groove can be decreased and the precision of the ball rolling groove can be enhanced.

According to a ninth aspect of the invention, there is provided the method as defined in any one of the sixth to eighth aspects of the invention, wherein the surface of the ball rolling groove is finished by the burnishing process.

According to the invention, since the plastic working tool having a smooth surface is pressed to the surface of the ball rolling groove, the surface of the ball rolling groove comes to a more smoothened mirror face by the burnishing work.

BRIEF DESCRIPTION OF THE DRAWINGS

FIGS. 3A and 3B are enlarged views showing ball rolling grooves, in which FIG. 3A shows a produce by a rolling process whereas FIG. 3B shows a product by a grinding process;

FIGS. 4A and 4B are graphs showing roughness in ball rolling grooves, in which FIG. 4A shows a product by a rolling process, and FIG. 4B shows a product by a grinding process;

FIGS. 10A and 10B are schematic views showing the flows of a blank material which is subjected to a rolling process, in which FIG. 10A shows the rolling of the flat face whereas FIG. 10B shows the rolling of the V shaped groove;

DETAILED DESCRIPTION OF THE PREFERRED EMBODIMENTS

Now, a description will be given in more detail of preferred embodiments of the invention with reference to the accompanying drawings.

Figure 1:
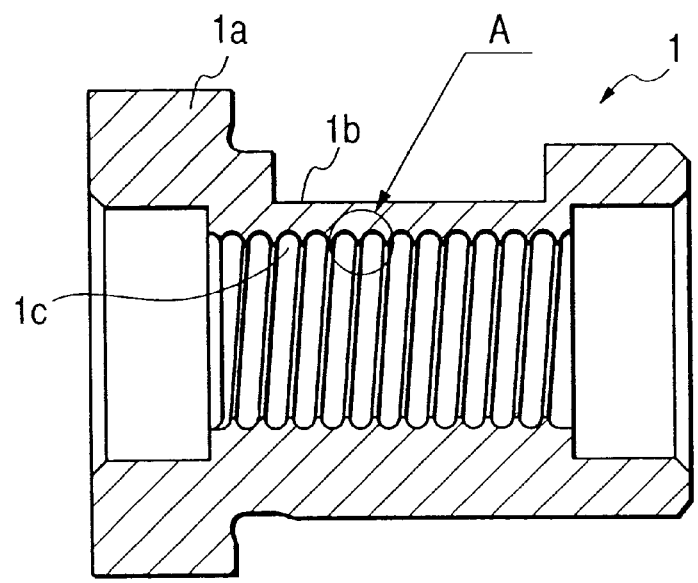
FIG. 1 is a cross sectional view showing a ball screwed nut according to an embodiment of the invention.
Figure 2:
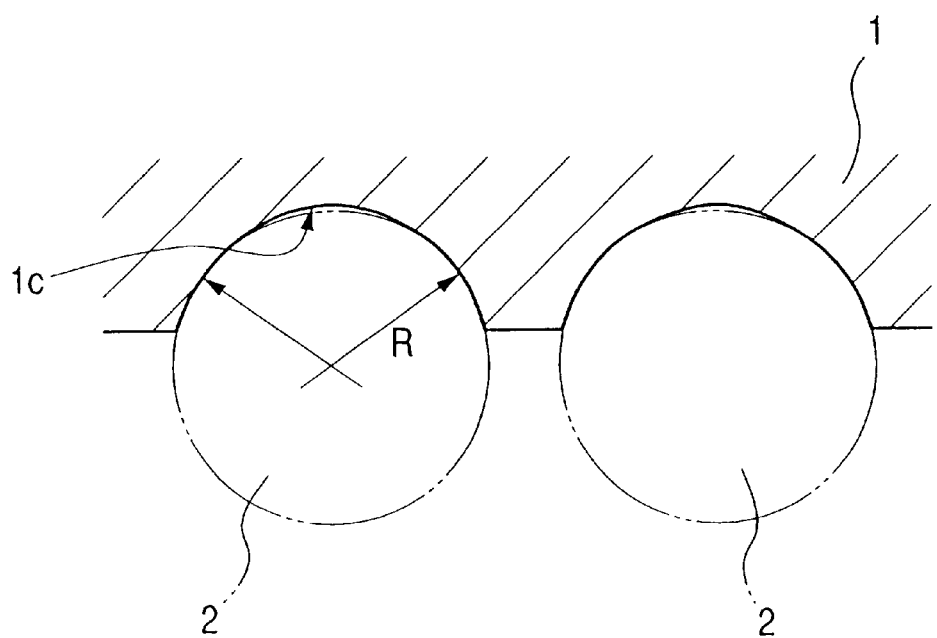
FIG. 2 is an enlarged view showing a part A of FIG. 1.

FIG. 1 shows a ball screwed nut 1 according to a first embodiment of the invention. The ball screwed nut 1 is almost cylindrical and has a flange 1a to be connected to a carrying machine or the like at one end thereof. A ball rolling groove 1c along which balls roll is defined in an inner peripheral surface of the ball screwed nut 1, and a flattened part 1b is defined on the outer peripheral surface thereof. The flattened part 1b is connected with a member such as a return pipe formed with a no-load return passage for connecting one end to the other end of the ball rolling groove 1c. In an endless circuit made up of the ball rolling groove 1c and the no-load return passage, balls are received in line. The ball rolls along the ball rolling groove 1c while receiving a load, passes through the no-load return passage and is again returned to the ball rolling groove. The cross section of the ball rolling groove 1c may, as shown in FIG. 2, be formed by combining two circular arcs each having the radius of curvature R slightly larger than the radius of the balls 2 (Gothic arc groove), or may be formed with one circular arc slightly larger than the radius of curvature of the balls 2 (circular arc groove).

The ball rolling groove 1c formed in the inner peripheral surface of the ball screwed nut 1 is subjected to a rolling process with the result that it is no longer necessary to machine the ball rolling groove 1c with a grinding stone as conventionally. Accordingly, the ball rolling groove 1c can be formed in a ball screwed nut 1 small in diameter into which the grinding stone could not be inserted. Further, when the ball rolling groove 1c having a large lead is ground in the grinding process, an angle at which a shaft of the grinding stone is inclined should be taken large. This causes the amount of the grinding stone going into a prepared hole 4b to be limited, resulting in a case where the ball rolling groove 1c having a large lead could not be ground in the conventional art. According to the ball screwed nut 1 subjected to the rolling process, the ball rolling groove 1c having a large lead can be easily formed merely by making large the lead of a rolling tap for forming the ball rolling groove 1c.

Figure 3A:
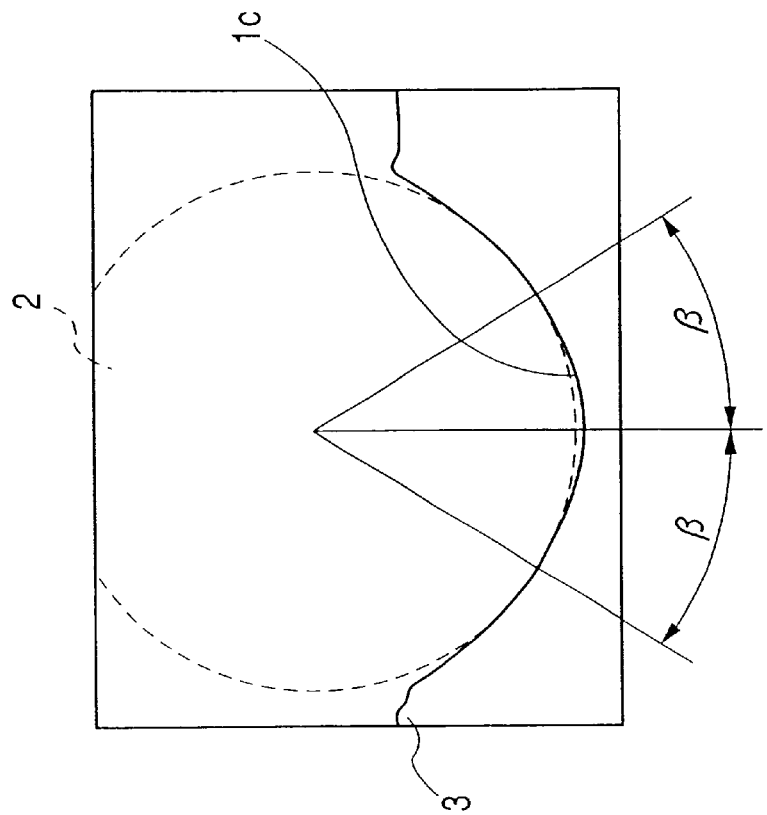
Figure 3B:
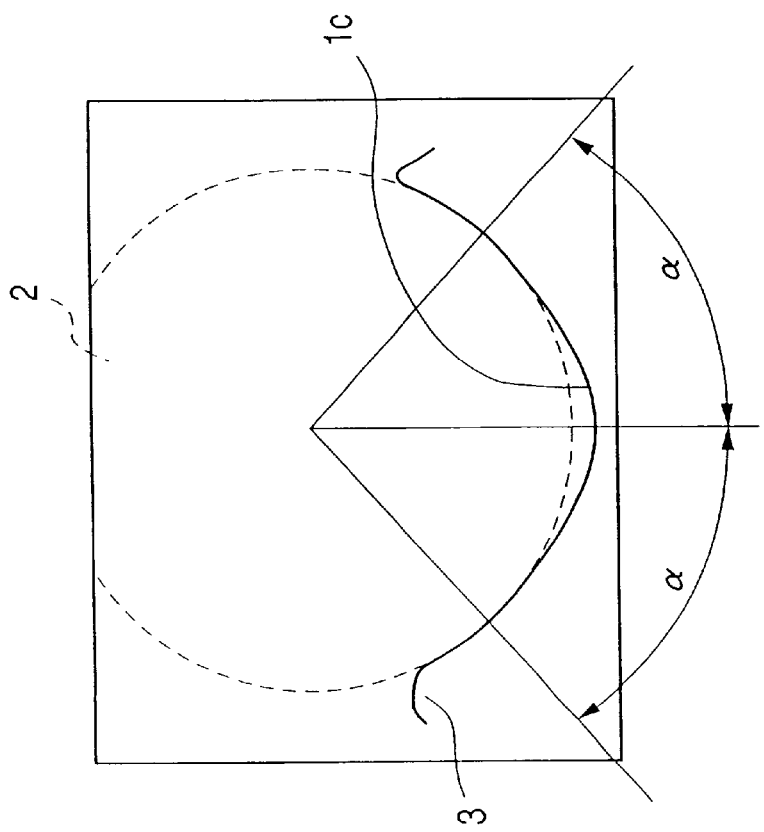

FIGS. 3A and 3B show the comparison of the cross sections of the ball rolling grooves 1c, where FIG. 3A is a product by the rolling process and FIG. 3B is a product by the grinding process As seen in those figures, in the rolled product shown in FIG. 3A, the R shape of the ball rolling groove 1c can be enhanced in precision as compared with the ground product shown in FIG. 3B. For example, in the rolled product shown in FIG. 3A, a symmetrically excellent shape is available at the edge 3 of the ball rolling groove 1c. In addition, a ball contact angle α of the rolled product shown in FIG. 3A is larger than a ball contact angle β of the ground product shown in FIG. 3B. Thus, the rolled product shown in FIG. 3A can obtain an ideal ball contact angle. The precision of the radius of curvature of the ball rolling surface can be made good by rolling the surface with the rolling tap little in wearing and excellent in durability, not with the grinding stone to be easily worn. Further, the ball screwed nuts obtained where diameters are less in variation, sizes are uniform and roundness is excellent.

Figure 4A:
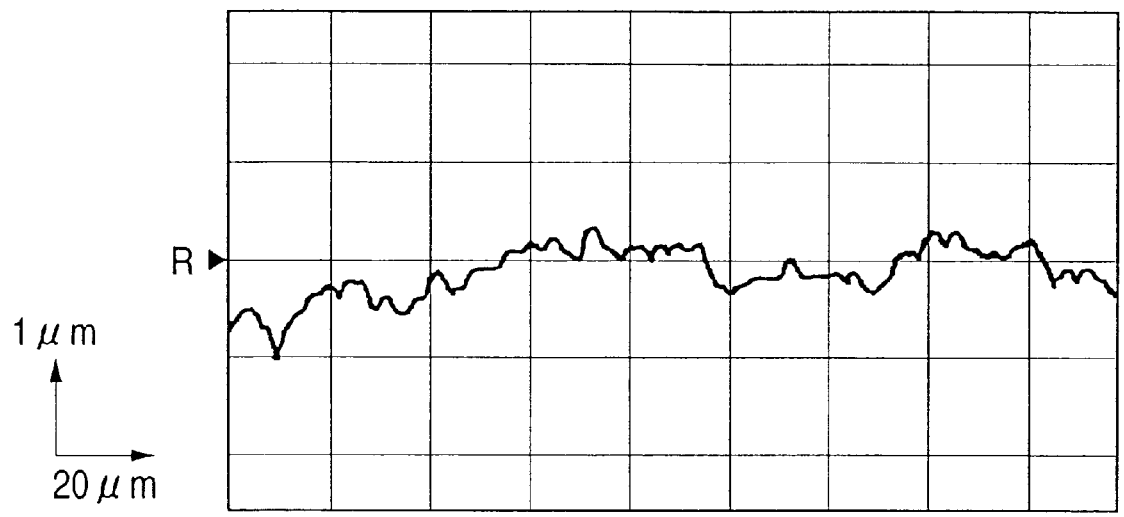
Figure 4A:
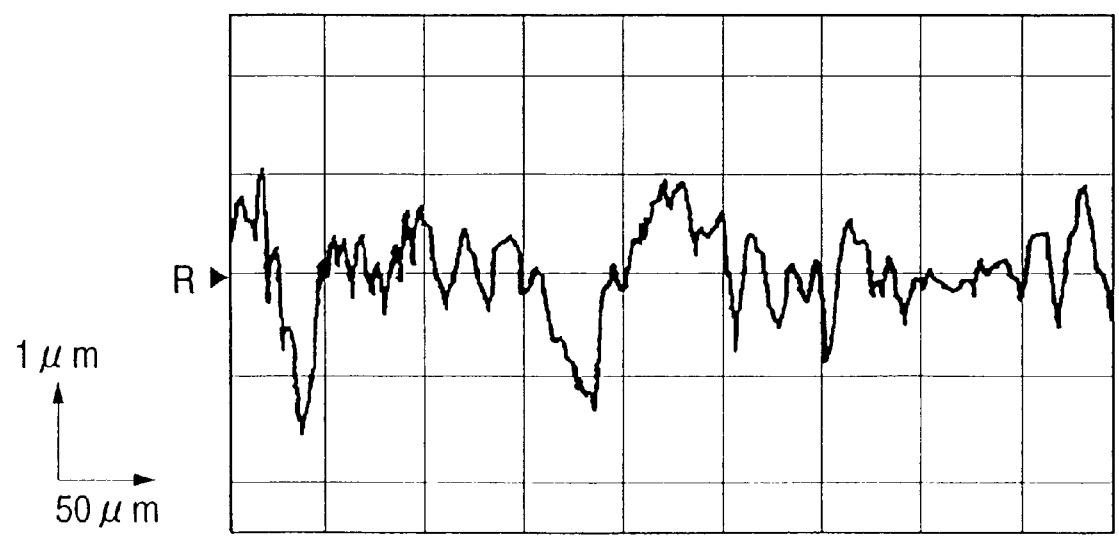

FIGS. 4A and 4B show the comparison of surface roughness of the ball rolling grooves 1c between the rolled product shown in FIG. 3A and the ground product shown in FIG. 3B. A seen in those figures, the rolled product shown in FIG. 3A is smaller in surface roughness than the ground product shown in FIG. 3B. The surface of the ball rolling groove 1c is finished by a burnishing process, as a result of which the roughness on the surface of the ball rolling groove 1c are evened to be a smoothened mirror face. Since the surface of the ball rolling groove 1c is processed in a sharp and flat face without causing roughness thereon, the wearing of the surface on the ball rolling groove 1c to be caused by rolling of the ball is reduced, and a pre-load is maintained. As a result, the durability of the ball screwed nut can be improved.

A material of the ball screwed nut is a stainless steel corresponding to Japanese Industrial Standards (JIS) SUS-27 which is an austenitic stainless steel, the chemical composition of which is shown in Table 1.

TABLE 1

| | Chemical composition (%) | | | | | | | | |
|---|---|---|---|---|---|---|---|---|---|
| JIS | C | Si | Mn | P | S | Ni | Cr | Mo | Cu | others |
| SUS-27 | 0.08 or less | 1.00 or less | 2.00 or less | 0.040 or less | 0.030 or less | 8.00 to 10.50 | 18.00 to 20.00 | | | |

Since the metallographic structure of the ball rolling groove 1c is continued in fibrous texture, the surface of the ball rolling groove 1c is work-hardened to increase hardness. The hardness of the ball rolling groove 1c which has been work-hardened is 40C or more in C scale of Rockwell hardness. The ball screwed nut 1 is made of a stainless steel corresponding to SUS-27 of the Japanese Industrial Standards (JIS), and since the hardness of the ball rolling groove 1c which has been work-hardened is set to 40C or more in C scale of Rockwell hardness, the ball rolling groove 1c which has the enough hardness to roll the balls 2 is obtained.

Figure 5:
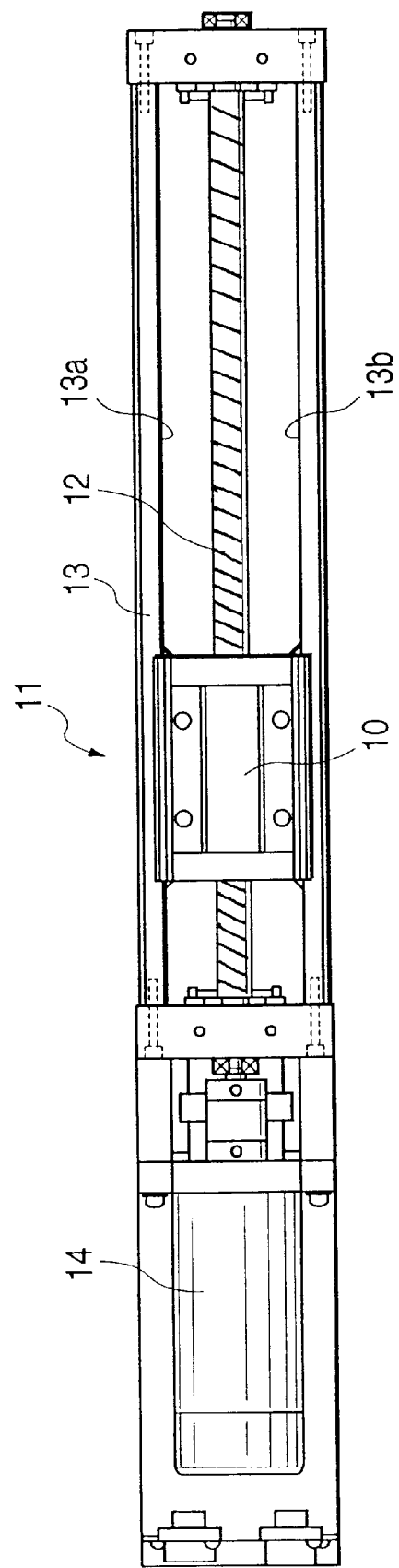
FIG. 5 is a plan view showing the linearly guiding apparatus according to another embodiment of the invention.

FIG. 5 shows a linearly guiding apparatus 11 according to an embodiment of the invention. This apparatus 11 includes a screw shaft 12 having a spiral ball rolling groove in the outer periphery, a slider 10 provided with an endless circuit containing a spiral ball rolling groove corresponding to the spiral ball rolling groove of the screw shaft 12, and a plurality of balls (not shown) received in line in the endless circuit so as to roll in association with actuation of the slider 10. The slider 10 is supported movably along the longitudinal direction of a guide rail 13 which is substantially U-shaped in cross section and right angled with respect to the longitudinal direction. Opposed inner surfaces 13a and 13b of the guide rail 13 are formed with ball rolling grooves for rails along the longitudinal direction. The slider 10 is also formed with an endless circuit for rails containing ball rolling grooves for rail corresponding to the ball rolling groove for rails defined in the guide rail 13. Also, in the endless circuit for rail of the slider 10, a plurality of balls are received in line so as to circulate therein in association with the movement of the slider 10. When the screw shaft 12 is rotationally driven by a motor 14, the slider 10 supported movably along the longitudinal direction of the guide rail 13 is reciprocated.

Figure 6:
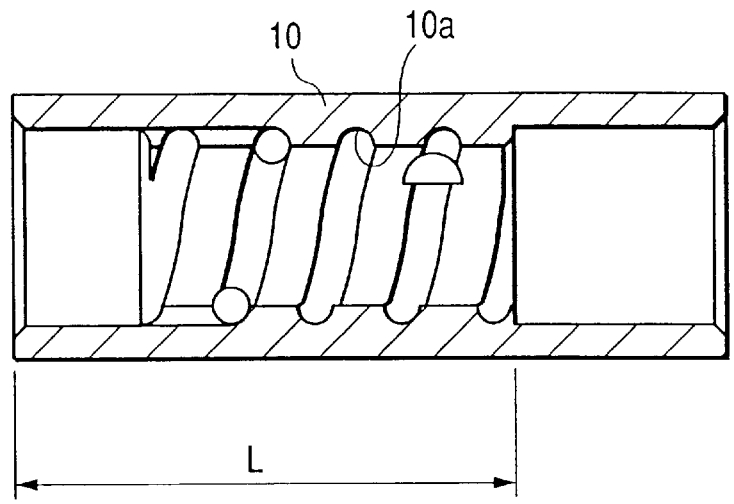
FIG. 6 is a cross sectional view of the slider of the linearly guiding apparatus.

FIG. 6 shows the cross section of the slider 10. A ball rolling groove 10a is formed in the inner peripheral surface of the slider 10 by a rolling process. Since the ball rolling groove 10a is formed by the rolling process, even if a distance L from the edge of the slider 10 to a groove processed position is long, the ball rolling groove 10a can be formed. Thus, a distance where the rolling tap is inserted from the edge of the slider 10 is not limited as in the grinding process, and the ball rolling groove 10a can be formed in the center of the slider 10. As a result, a force for reciprocating the slider 10 supported by the guide rails 13 can be exerted a t the center of the slider 10 so that the slider may be prevented from twisting to make good balance in reciprocation of the slider 10.

Figure 7:
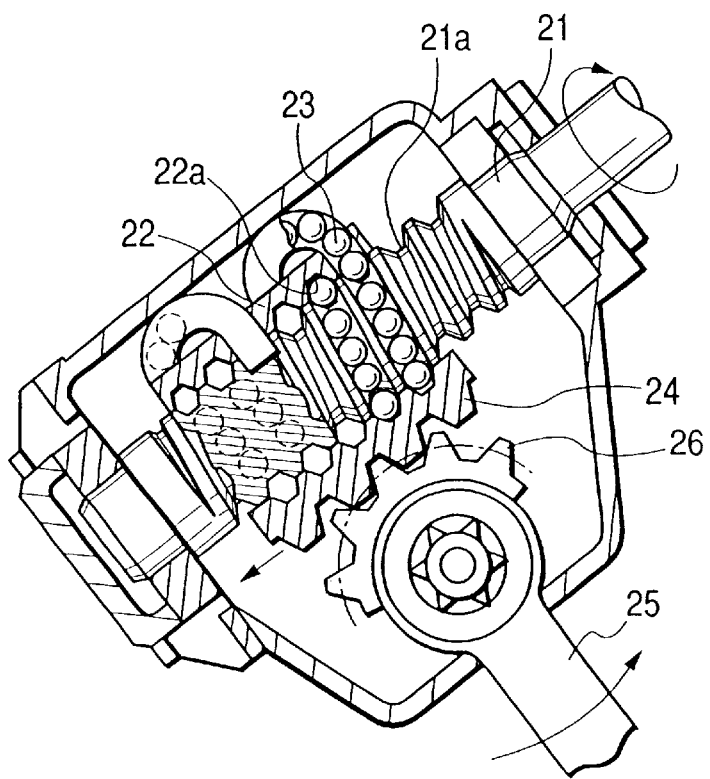
FIG. 7 is a cross sectional view showing a ball screwed nut for steering according to another embodiment of the invention.

FIG. 7 shows a ball screwed nut for steering. A steering wheel (not shown) is connected with a screw shaft 21 having a spiral ball rolling groove 21a for the screw shaft in an outer peripheral surface thereof. On the other hand, a ball screwed nut 22 is formed in an inner peripheral surface thereof with an endless circuit having a spiral ball rolling groove 22a corresponding to the ball rolling groove 21a for screw. In the endless circuit, a large number of balls 23 are received in line so as to roll while receiving a load between the ball rolling grooves 21a and 22a. A steering gear 24 formed of a rack is disposed on the outer peripheral surface of the ball screwed nut 22. A steering arm 25 has a sector gear 26 in mesh with the steering gear 24. When the steering wheel rotates, the screw shaft 21 rotates and the ball screwed nut 22 moves in an axial direction of the screw shaft 21. With the movement of the ball screwed nut 22, the steering arm 25 is oscillated in association with movement of the ball screwed nut 22. With the arrangement of a large number of balls 23 in line, the balls 23 are brought in roll contact with the screw shaft 21 and the ball screwed nut 22 to reduce friction, thereby making the steering light.

The ball rolling groove 22a is formed by the rolling process similarly to the ball screwed nut 1. Since the ball rolling groove 22a of the ball screwed nut 22 is subjected to the rolling process, the surface of the ball rolling groove 22a is made sharp, flat and mirror-finished without any roughness. Consequently, the wearing of the surface of the ball rolling groove 22a to be caused by rolling the balls 23 is reduced, the pre-load is maintained, and the durability of the ball screwed nut for steering can be improved. The precision of the radius of curvature of the surface of the ball rolling groove 22a can be made good by rolling the ball rolling groove 22a with the rolling tap little in wearing and excellent in durability, not with the grinding stone to be easily worn.

Figure 8A:
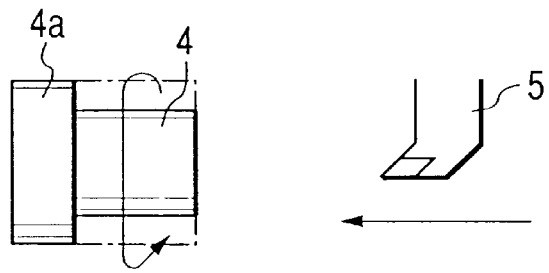
FIGS. 8A to 8F are views showing steps of a method of manufacturing a ball screwed nut according to another embodiment of the invention.
Figure 8B:
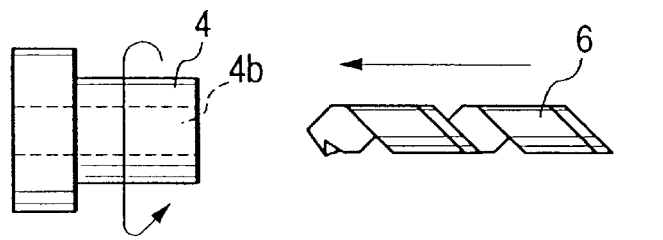
Figure 8C:
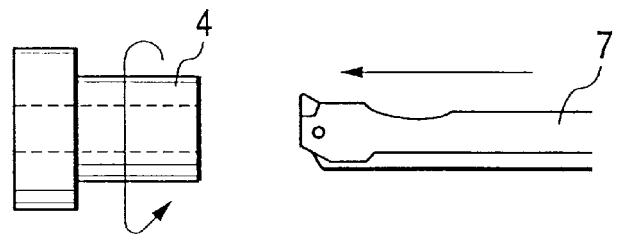
Figure 8D:
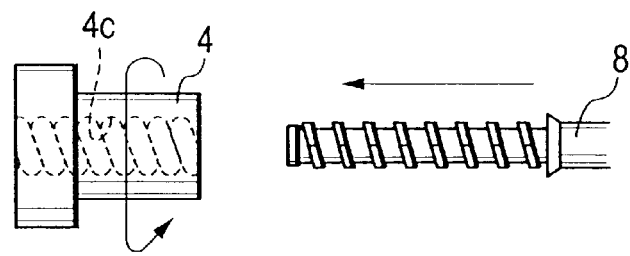
Figure 8E:
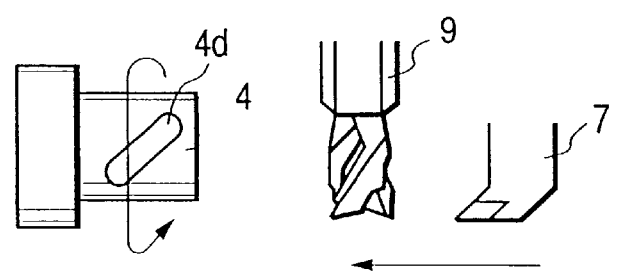
Figure 8F:
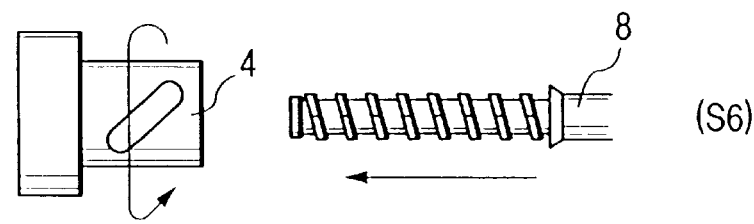

FIGS. 8A to 8F show a method of manufacturing the ball screwed nut 1 according to an embodiment of the invention. At first, as shown in FIG. 8A, an outer periphery of a cylindrical blank material 4 is cut by a bite 5 into a flange 4a (step S1). At this time, the outer diameter of the blank material 4 is cut to be slightly larger than a finished size. Next, as shown in FIG. 8B, the blank material 4 is formed with a prepared hole 4b by a drill 6 (step S2). A diameter of the prepared hole 4b is optimally selected taking the flow of the blank material 4 in the vicinity of the ball rolling groove 22a into consideration. Subsequently, as shown in FIG. 8C, the prepared hole 4b is widened up to a correct size by a boring bite 7 (step S3). Then, the surface roughness of the prepared hole 4b is finished to be 6.3S or more. Thereafter, as shown in FIG. 8D, the blank material 4 is rotated at low speed of 100 to 200 rpm, and a rolling tap 8 is inserted into the prepared hole 4b so as to roll the ball rolling groove 4c in the blank material 4 (step S4). The surface of the ball rolling groove 4c is burnish-finished by the rolling process using the rolling tap 8 having a flat face. In the rolling process, a cutting oil is fully applied to prevent heating by the blank material 4. Next, as shown in FIG. 8E, a return part 4d for circulating the balls 23 is groove-processed in the blank material 4 by an end mill 9, and the outer periphery of the blank material 4 is cut by the bite 5 to finish the outer diameter (step S5). Finally, as shown in FIG. 8F, the rolling tap 8 is again allowed to pass through the ball rolling groove 4c of the blank material 4 for removing burrs of the ball rolling groove 4c (step S6)

Since the blank material 4 is formed with the ball rolling groove 4c through the rolling process (step S4), it is no longer necessary to grind the ball rolling groove 4c with the grinding stone as in the conventional method. Consequently, a processing cost for the ball rolling groove 4c can be saved. In addition, since the number of processing steps is decreased, the lead time can be shortened.

When the blank material 4 large in inner diameter is subjected to the rolling process, the cutting process is provided for cutting a spiral groove in the inner peripheral surface of the prepared hole 4b by means of a bite or a cutting tap between the process of forming the prepared hole 4b (steps S2, S3) and the process of rolling the ball rolling groove 1c in the prepared hole 4b (step 34). That is, a spiral groove is cut in the inner peripheral surface of the prepared hole 4b, and subsequently the rolling tap is screwed into the spiral groove so as to roll the ball rolling groove 4c in the blank material 4.

As described above, with provision of the process of cutting the spiral groove in the prepared hole 4c, the processing resistance of the rolling tap 8 can be decreased in the rolling process, thereby making it possible to roll ball screwed nuts having the ball rolling grooves large in diameter.

Figure 9A:
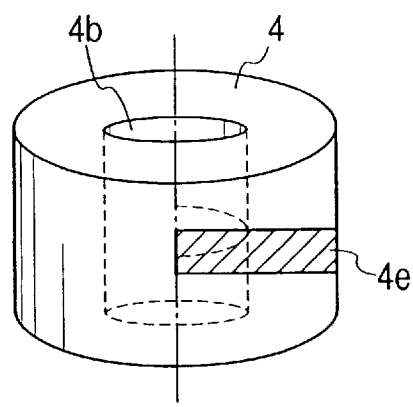
FIGS. 9A and 9B are perspective views showing spiral V shaped grooves formed in a prepared hole.
Figure 9B:
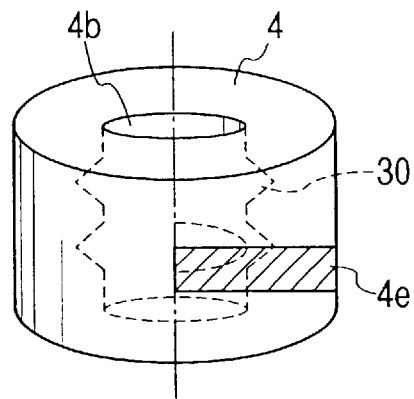
Figure 10A:
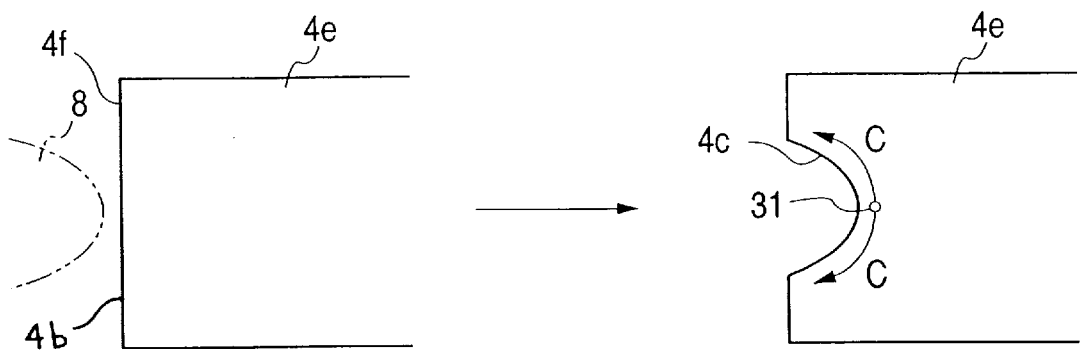
Figure 10B:
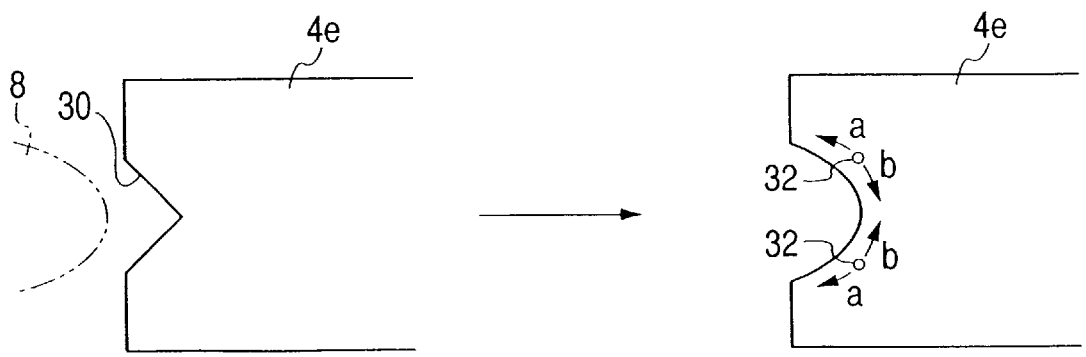

As shown in FIGS. 9A and 9B, there is a case in which grooves are formed in spiral grooves of almost V shape in cross section depending upon the cutting process. FIG. 9A shows a blank material 4 formed with only a prepared hole 4b whereas FIG. 9B shows a blank material 4 cut with V shaped spiral grooves 30 in a prepared hole 4b. FIGS. 10A and 10B show a comparison of flows of parts 4e cut in the blank material 4. FIG. 10A shows a case in which a flat face 4f formed with only a prepared hole 4b is subjected to a rolling process with the rolling tap 8. FIG. 10B shows a case in which a spiral V shaped groove 30 in cross section is subjected to the rolling process with the rolling tap 8.

Figure 11:
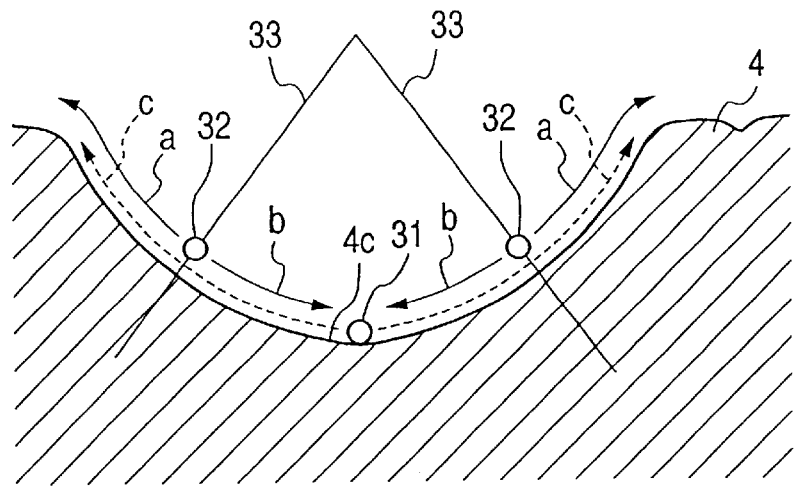
FIG. 11 is a cross sectional view for explaining the flowing of the blank material in the ball rolling groove.

As shown in FIGS. 10A, 10B and 11, the blank material 4 flows outwardly by a pressure of the rolling tap 8 in left and right directions (c-directions) from a diverging point of a radius of curvature shaped bottom 31 of the ball rolling groove 4c. On the contrary, in the case where the V shaped groove 30 is subjected to the rolling process, the blank material 4 is diverged into two directions, that is, a direction of the R cross sectional bottom (b-direction) and outwardly thereof (a-direction) at diverging points of the flow which are first contacts 32 between the rolling tap 8 and the V-shaped groove 30. Therefore, compared with a case of causing the blank material 4 to flow outwardly from the R cross sectional bottom 31, a flowing distance of the blank material 4 is shortened, and an amount of microscopic spring back caused by plastic deformation of the section of the ball rolling groove 1c can be decreased. As a result, the precision of the ball rolling groove 1c can be enhanced. Further, the first contacts 32 (the diverging point of flowing of the blank material) with the rolling tap 8 and the V shaped groove 30 are taken on the line of contact angle so that the flowing of the blank material 4 can be diverged from the line of contact angle as a starting point.

Figure 12:
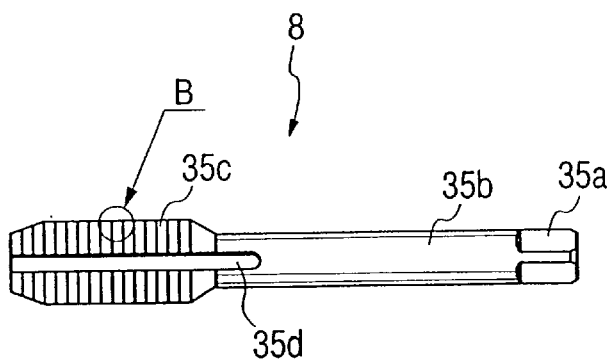
FIG. 12 is a plan view showing the rolling tap.
Figure 13:
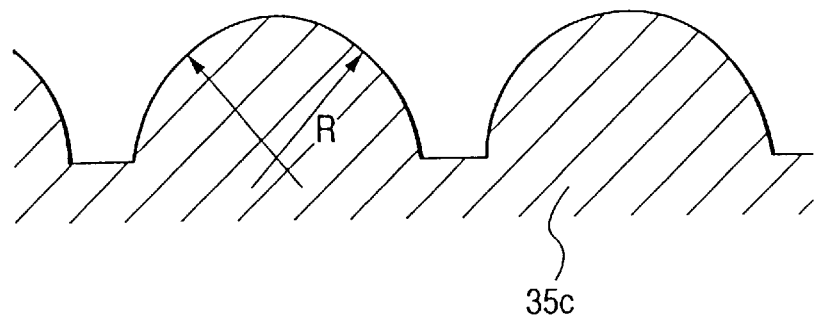
FIG. 13 is an enlarged view showing a part B of FIG. 12.

The rolling tap 8 includes, as seen in FIGS. 12 and 13, a square part 35a to be chucked to a machine tool, a shank part 35b and a rolling edge 35c. A material of the rolling tap 8 is SUS 440. The rolling edge 35c is formed with a spiral thread and is formed at a front end thereof with taper to be ready for catching the blank material 4. A cross section of the thread is almost arc shaped as shown in FIG. 13, which corresponds to a cross section of the ball rolling groove 4c, and may be formed by combining two circular arcs having the radius of curvature R slightly larger than the radius of the balls 2 (Gothic arc groove) or may be formed with one circular arc slightly larger than the radius of curvature of the balls 2 (circular arc groove). In addition, the rolling edge 35c is provided with grooves 35d at four equal parts in a peripheral direction thereof. The rolling edge 35c is coated with Tin on the surface so as to be smoothened. When a process of cutting the groove 30 spirally or V shaped in cross section is conducted prior to the rolling process, the front end of the rolling edge 35c may be continuously formed with the cutting edge having the same lead integrally with the rolling edge 35c.

As was described above, according to the invention, since the ball rolling groove in which the balls of the ball screwed nut are rolled is formed by the rolling process, the ball screwed nuts can be formed not depending upon the cutting process. This makes it possible to form ball screwed nuts of small diameter or large lead. The surface of the ball rolling groove is processed to be sharp without any roughness by the plastic working of the rolling process and finished in a mirror face with less roughness. Further, since the ball rolling groove is formed by the rolling process not by the grinding stone which is liable to be worn but by the plastic working tool such as a rolling tap less in wear and excellent in the durability, the precision of the radius of curvature of the surface of the ball rolling groove can be made preferable.

What is claimed is:

1. A ball screwed nut comprising:

a nut body having a ball rolling groove defined in an inner peripheral surface thereof; and a plurality of balls inserted and rolling in said ball rolling groove portion;

wherein said ball rolling groove is formed by cutting a spiral groove in the inner peripheral surface and a rolling process; and the spiral groove to be formed by the cutting process is almost V-shaped in cross section.

2. The ball screwed nut as claimed in claim 1, wherein a surface of said ball rolling groove is finished by a burnishing process.

3. The ball screwed nut as claimed in claim 1, wherein said ball screwed nut is made of a stainless steel corresponding to SUS-27 of Japanese Industrial Standards (JIS), and hardness of the surface of said ball rolling groove which has been subjected to work hardening by the rolling process is 40 or more in C scale of Rockwell hardness.

4. A linearly guiding apparatus comprising:

a ball screwed shaft having a first spiral ball rolling groove in an outer peripheral surface thereof;

a guide rail;

a slider supported moveably in a longitudinal direction of said guide rail, said slider including an endless circuit with a second spiral ball rolling groove corresponding to said first spiral ball rolling groove; and a plurality of balls arranged in line in said endless circuit so as to roll in association with movement of said slider, said slider being reciprocated with the rotation of said ball screwed shaft;

wherein said second ball rolling groove of said slider is formed by cutting a spiral groove in the inner peripheral surface and a rolling process and;

the spiral groove to be formed by the cutting process is almost V-shaped in cross section.

5. A ball screw for steering, comprising:

a ball-screwed shaft having a first spiral ball rolling groove in an external peripheral surface thereof and connected to a steering wheel;

a ball screwed nut having an endless circuit with a second spiral ball rolling groove corresponding to said first ball rolling groove and a steering gear on an outer periphery thereof; and a plurality of balls arranged in said endless circuit of said ball screwed nut so as to roll therein while receiving a load between said first and second ball rolling grooves;

wherein said second ball rolling groove of said ball screwed nut is formed by cutting a spiral groove in the inner peripheral surface and a rolling process; and the spiral groove to be formed by the cutting process is almost V-shaped in cross section.

6. A method of manufacturing a ball screwed nut having a spiral ball rolling groove in which balls roll, said method comprising the steps of:

forming a prepared hole in a blank material; and rolling said ball rolling groove by relatively rotating the blank material and a plastic working tool while inserting the plastic working tool into the prepared hole and;

cutting a spiral groove in the inner peripheral surface of the prepared hole.

7. The method as claimed in claim 6, wherein the spiral groove to be formed by the cutting process is almost V-shaped in cross section.

8. The method as claimed in claim 6, wherein the surface of said ball rolling groove is finished by a burnishing process.

* * * * *